Jan. 8, 1946.   A. W. BEAVON   2,392,519
CENTER DRILL
Filed Sept. 1, 1943

Inventor
A. W. Beavon
By Glascock Downing Seibold
Attys.

Patented Jan. 8, 1946

2,392,519

UNITED STATES PATENT OFFICE 2,392,519

CENTER DRILL

Alfred William Beavon, Coventry, England, assignor to A. C. Wickman Limited, Coventry, England Application September 1, 1943, Serial No. 500,849
In Great Britain October 21, 1942

1 Claim. (Cl. 77—66)

Prior to mounting a work piece on or between a supporting center or centers in a lathe or other machine tool it is usual to drill in one or each end of the work piece an axial recess of conical form, for receiving a supporting center. The drill used for drilling such a center recess usually consists of a small pilot portion of cylindrical form and a truncated conical portion, the pilot portion being situated at the apex of the conical portion, and the angle of the conical portion being similar to that ordinarily used on supporting centers. The use of such drills is accompanied by two disadvantages. In the first place the pilot portion is relatively weak and easily broken. In the second place, the end face of the work piece must be trimmed square with the axis of rotation, or a short recessed enlargement must be formed at the outer end of the conical recess, to ensure proper contact between the supporting center and the recess, when dealing with work pieces required to be machined to a high degree of accuracy.

The object of the present invention is to provide an improved center drill which obviates both of the said disadvantages.

The invention consists of a center drill having its operative end shaped to an invert connoidal form fairing the body portion to the pilot portion such that the recess formed by it has a convex surface enabling a work piece to be carried on an ordinary supporting center at a position between the ends of the recess.

Figure 1:
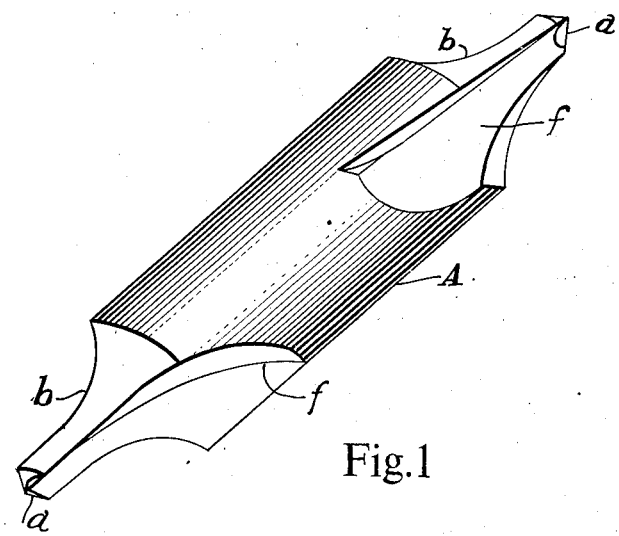
Figure 2:
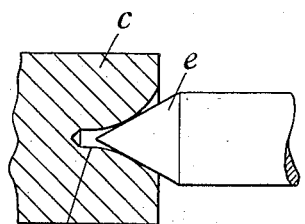

In the accompanying drawing:

Figure 1 is a perspective view of a center drill embodying the invention, and Figure 2 represents a portion of a work piece having a center recess formed by the said drill and a portion of a supporting center engaging the recess.

As shown in Figure 1 the forward end of the cylindrical body A of the drill is formed with a pilot portion $a$ of a pointed form. The portion $b$ immediately adjacent the cylindrical body portion is of an invert connoidal shape fairing the body portion to the pilot portion and constitutes the main feature of the invention. The shape of the part $b$ is such that a recess formed by it in a work piece as $c$ (Figure 2) has a convex surface $d$, this surface being such that it provides a circumferential line of contact with the conical surface of the supporting center $e$ and this line lies at a position between the ends of the recess.

It will be understood that the drill is formed with cutting edges in any suitable manner. In the present instance the pilot portion and invert connoidal portion have flutes $f$ providing cutting edges which extend slightly into the body portion as shown in Fig. 1.

A center drill made in accordance with the invention is stronger at its smaller end than a center drill of ordinary formation, and the form of recess produced by it obviates the usual need for trimming the outer end face of the work piece, or of enlarging the entrance to the recess. Moreover a further advantage is obtained inasmuch as when it is necessary to lap or grind the recess (a procedure also commonly adopted when the work piece is required to be machined to a high degree of accuracy) the lapping or grinding operation is simplified as it is only necessary to lap the portion adjacent to the line of contact with the supporting center.

Having thus described my invention what I claim as new and desire to secure by Letters Patent is:

A center drill including a cylindrical body having at least one end provided with a pointed pilot portion, the portion immediately adjacent the body portion having an invert connoidal shape fairing the body portion to the pilot portion, and the pilot portion and invert connoidal portion having flutes providing cutting edges which extend slightly into the body portion.

ALFRED WILLIAM BEAVON.